(12) United States Patent
Terao

(10) Patent No.: US 7,725,924 B2
(45) Date of Patent: May 25, 2010

(54) NETWORK SYSTEM, USE PERMISSION DETERMINING METHOD, NETWORK DEVICE, AND RECORDING MEDIUM

(75) Inventor: Yuichi Terao, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1287 days.

(21) Appl. No.: 11/226,321

(22) Filed: Sep. 15, 2005

(65) Prior Publication Data

US 2006/0064741 A1    Mar. 23, 2006

(30) Foreign Application Priority Data

Sep. 17, 2004    (JP)    ............................ 2004-272465

(51) Int. Cl.
G06F 21/00    (2006.01)
G06F 7/04    (2006.01)
H04L 9/32    (2006.01)

(52) U.S. Cl. .................. 726/2; 726/4; 726/27; 726/28; 726/29; 713/182

(58) Field of Classification Search .................. 726/27, 726/2, 4, 28, 29; 713/182
See application file for complete search history.

(56) References Cited

U.S. PATENT DOCUMENTS 7,076,795 B2 *   7/2006   Hahn .............................. 726/2

2004/0010795 A1 *   1/2004   Sasaki et al. ................. 719/321

FOREIGN PATENT DOCUMENTS

| JP | 10-58796 | 3/1998 |
| JP | 2002-178567 | 6/2002 |
| JP | 2002-202945 | 7/2002 |
| JP | 2002-240398 | 8/2002 |

* cited by examiner

Primary Examiner—Nasser Moazzami
Assistant Examiner—Mohammad W Reza
(74) Attorney, Agent, or Firm—Oblon, Spivak, McClelland, Maier & Neustadt, L.L.P.

(57) ABSTRACT

A network system including a network device and an authentication device is disclosed. The authentication device includes a storing unit for storing identification information items indicating users, and a transmitting unit for transmitting, upon receiving the identification information item indicating one of the users from the network device, a group information item indicating the group to which the user belongs. The network device includes a storing unit for storing use permission information items on a per-group basis, each item indicating which function of the network device is permitted to be used, a transmitting unit for transmitting the identification information item indicating the user trying to use the network device to the authentication device, and a determining unit for receiving the group information item from the authentication server so as to determine which function of the device the user is permitted to use based on the received the group information item.

7 Claims, 17 Drawing Sheets

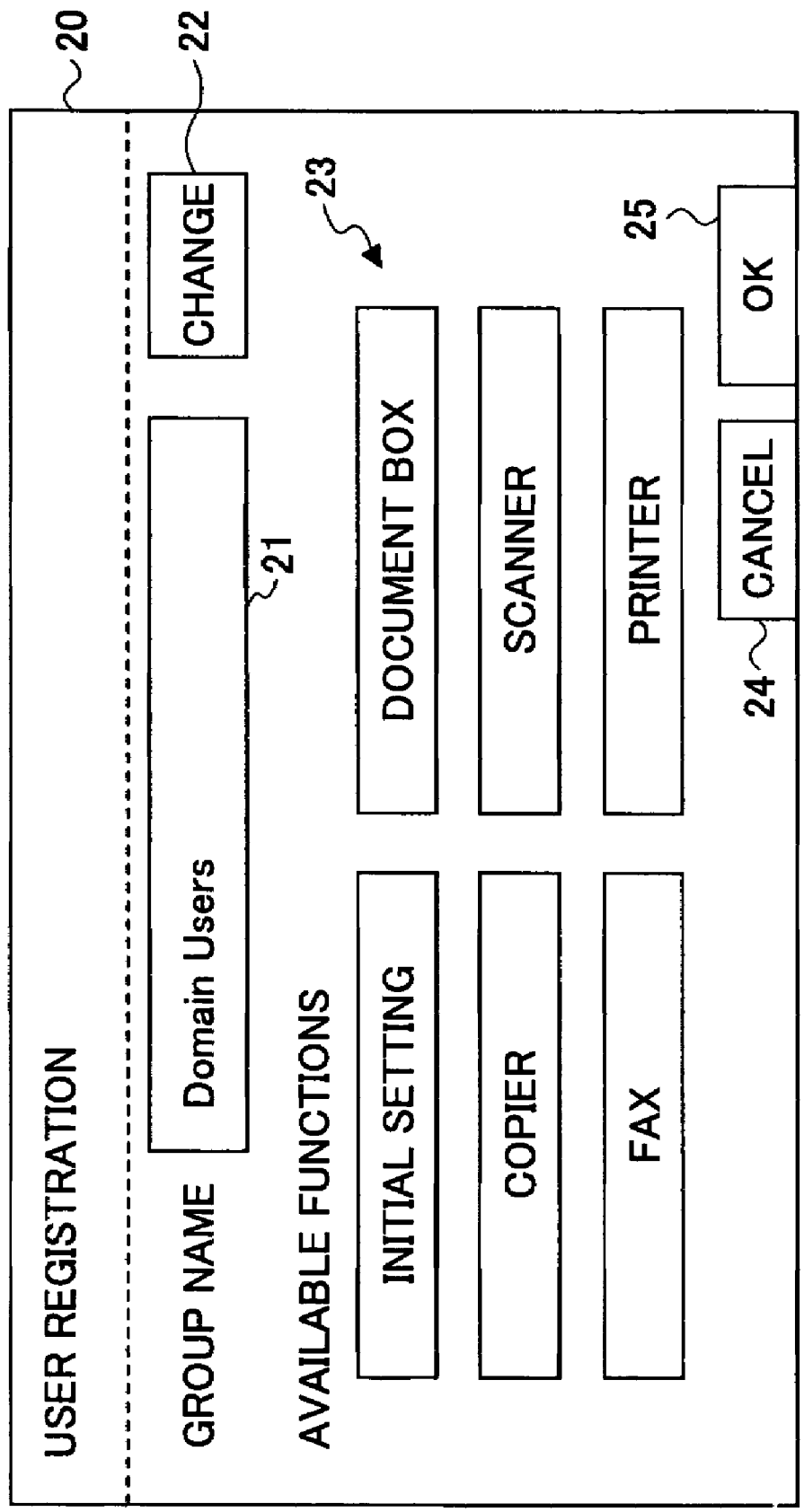

FIG.4B

COPIER USE REGISTRATION   Domain Users

AVAILABLE COLORS

B&W | ONE COLOR | TWO COLOR | FULL COLOR

NUMBER OF COPIES: NO LIMIT | LIMITED | 100

TORAY: TRAY 1 | TRAY 2 | MANUAL FEED TRAY

CANCEL   OK

NETWORK SYSTEM, USE PERMISSION DETERMINING METHOD, NETWORK DEVICE, AND RECORDING MEDIUM

BACKGROUND OF THE INVENTION

1. Field of the Invention

The present invention relates to a network system including a network device that permits a user to use functions according to permission, and an authentication server capable of communicating with the network device; a use permission determining method for use in the network device; the network device; and a computer-readable recording medium having a program embodied therein for controlling the network device with use of a computer.

2. Description of the Related Art

There have been digital multifunction devices (MFP) that can limit available functions to users on a per-user basis or a per-group basis. These devices identify the users based on, for example, user codes entered by the users on operations panels of the devices or ID cards of the users, and allow the users to use the functions within the scope of permission granted to the users.

In such devices, it is possible to limit colors in copying, or functions in fax transmission, printing, and scanning on a per-user basis. It is also possible to limit the number of sheets on a per-group basis according to a calculated number of sheets used by each group so as to prevent excessive use.

Examples of these types of devices are disclosed, for example, in Patent Documents 1-3.

[Patent Document 1] Japanese Patent Laid-Open Publication No. 2002-178567

[Patent Document 2] Japanese Patent Laid-Open Publication No. 2002-240398

[Patent Document 3] Japanese Patent Laid-Open Publication No. 10-58796

Devices disclosed in Patent Documents 1-3 are configured to perform user identification (authentication) by themselves. Meanwhile, there is disclosed a system, e.g., in Patent Document 4, that includes a directory server for centrally managing user information and information indicating permission for use of the network devices granted to individual users. In this system, the network devices determine whether use permission is granted to a user by using an authentication function of the directory server.

[Patent Document 4] Japanese Patent Laid-Open Publication No. 2002-202945

According to Patent Documents 1-3, a network device for providing their functions to users performs authentication. Therefore, if plural network devices are used in a user environment, registration or deletion of information such as a user ID and a password need to be carried out in each of the network devices so as to add or delete a user, resulting in troublesome setting operations.

Such a problem may be solved by providing a server as disclosed in Patent Document 4 that centrally manages user information for network login or the like, and information about permission for use of individual devices. In implementation of such a central information management system by a server, a database describing user access to each network device needs to be created. However, creating such a database requires knowledge in networking as well as being troublesome work.

SUMMARY OF THE INVENTION

The present invention solves at least one problem described above. More specifically, the present invention allows easy setting of use permission of users even when a number of network devices are used.

According to an aspect of the present invention, there is provided a network system comprising a network device and an authentication device, wherein the authentication device includes a storing unit that stores identification information items indicating users who use the network device, and group information items indicating groups to which the users belong; and a transmitting unit that transmits, upon receiving from the network device the identification information item indicating one of the users trying to use the network device, the group information item indicating the group to which the user indicated by the received identification information item belongs; and wherein the network device includes a storing unit that stores use permission information items on a per-group basis, each item indicating which function of the network device is permitted to be used; a transmitting unit that transmits the identification information item indicating the user trying to use the network device to the authentication device; and a determining unit that determines which function of the network device the user trying to use the network device is permitted to use, based on the group information item received from the authentication device.

BRIEF DESCRIPTION OF THE DRAWINGS

FIGS. 4A-4C illustrate screens for accepting input of use permission information in an operations display section of the MFP of FIG. 3 and storing the information into a permission information storing section;

DETAILED DESCRIPTION OF THE PREFERRED EMBODIMENT

The following description provides exemplary embodiments of the present invention with reference to the accompanying drawings.

Embodiment

FIGS. 1-8

This section describes a digital multifunction device (MFP) 100, which is an embodiment of a network device of the present invention, and a network system including the MFP 100 with reference to FIGS. 1-8.

Figure 1:
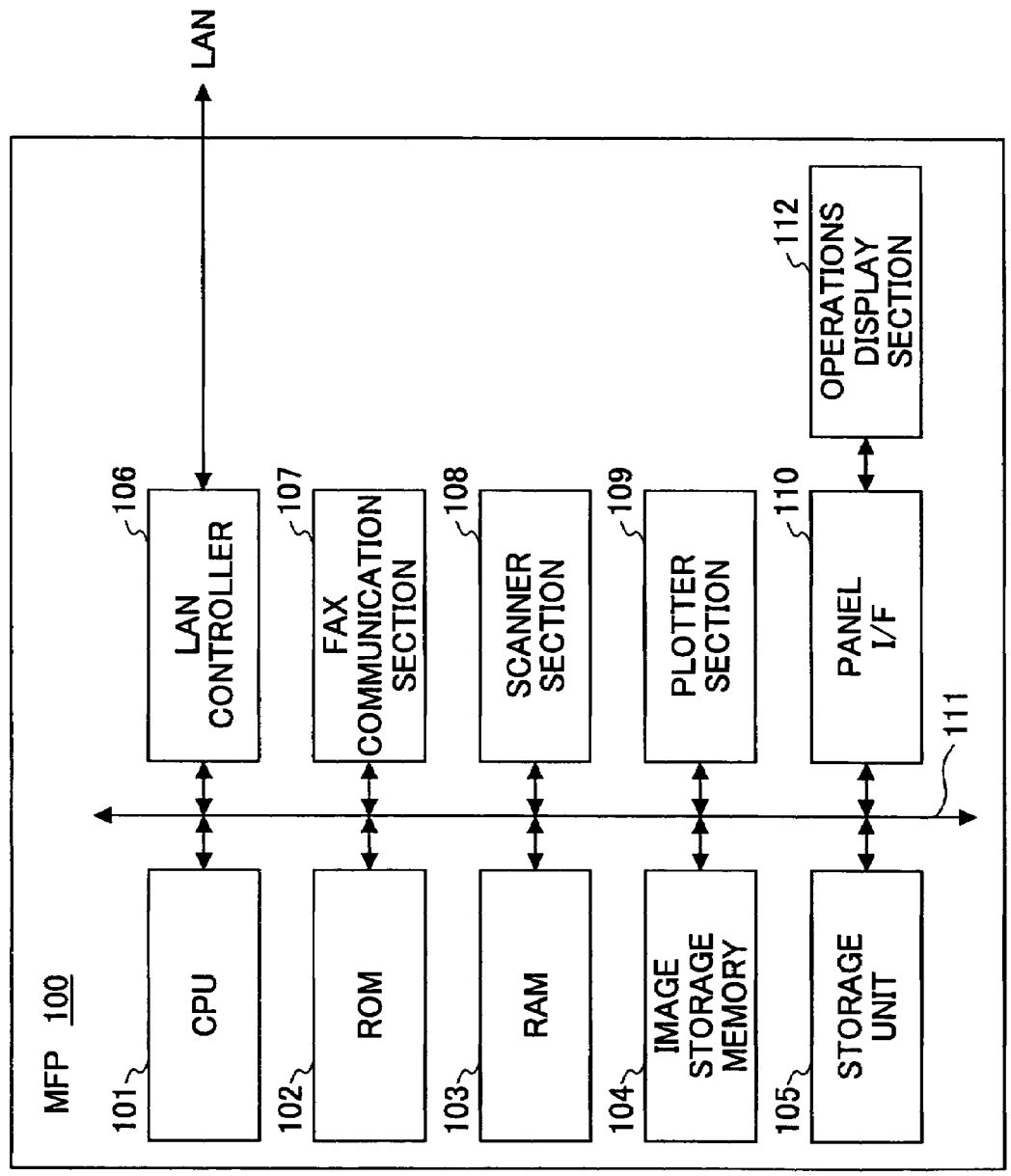
FIG. 1 is a block diagram illustrating a hardware configuration of a MFP as an embodiment of a network device according to the present invention.

FIG. 1 shows a configuration of the MFP 100.

As shown in FIG. 1, the MFP comprises a CPU 101, a ROM 102, a RAM 103, an image storage memory 104, a storage unit 105, a LAN (local area network) controller 106, a FAX (facsimile) communication section 107, a scanner section 108, a plotter section 109, a panel I/F (interface) 110, and a system bus 111 interconnecting the components 101-110. An operations display section 112 is connected to the panel I/F 110.

The CPU 101 controls the entire operation of the MFP 100. Specifically, the CPU 101 executes various programs stored in the ROM 102 and the storage unit 105 so as to provide functions such as a transmitting function and a determining function, thereby realizing various functions characteristic of this embodiment.

The ROM 102 is a nonvolatile memory that stores control programs executable by the CPU 101 and fixed parameters. In place of the ROM 102, a rewritable memory may be used so as to allow update of stored data.

The RAM 103 is a volatile memory used for temporarily holding data or used as a work memory of the CPU 101. Preferably, the RAM 103 is backed up by a battery to prevent losing stored data when power is lost.

The image storage memory 104, including a RAM, stores images received by the FAX communication section 107 and image data read by the scanner section 108.

The storage unit 105 is a rewritable nonvolatile storage unit including a NVRAM (nonvolatile RAM) and an HDD (hard disk drive). The storage unit 105 stores control programs executable by the CPU 101, data that need to be saved when power is turned off, and parameter values. It is preferable to store permission information (described below) in the storage unit 105.

The LAN controller 106 is an interface for communication in Ethernet™, and includes an interface for connecting the MFP 100 to a network and a circuit for controlling communications. The LAN controller 106 and the CPU 101 serve as a communication unit to communicate with other devices via the network. The network may include various types of wired and wireless networks such as Ethernet, wireless LANs, and IEEE (Institute of Electrical and Electronic Engineers) 1394.

The FAX communication section 107 includes an encoder/decoder for encoding and decoding images, and a network controller for controlling communications via a public communication network. The FAX communication section 107 sends and receives image information to and from external devices by FAX transmission.

The scanner section 108 serves to read images of documents as image data.

The plotter 109 forms images onto paper based on the image data.

The panel I/F 110 is an interface that connects the operations display section 112 to the system bus 111. The operations display section 112 includes various keys and a LCD operations panel operable as a touch panel. The operations display section 112 shows messages and GUIs on the screen and allows users to input instructions and information.

In the MFP 100 with the configuration described above, the CPU 101 executes predetermined programs to control the components of the MFP 100. Thus, the MFP 100, as an image processing device, provides various functions such as printing, scanning, copier, and fax communication functions.

Figure 2:
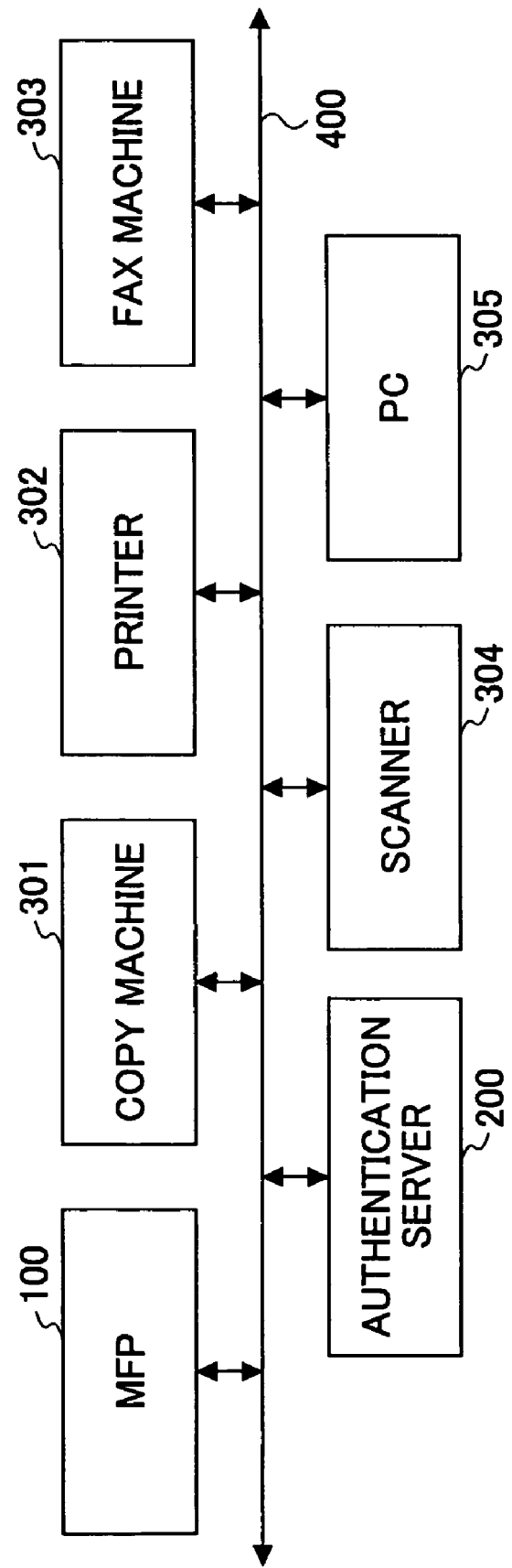
FIG. 2 is a block diagram illustrating a configuration example of a network system including the MFP of FIG. 1.

FIG. 2 illustrates a configuration example of a network system including the MFP 100.

In the network system shown in FIG. 2, which is an embodiment of a network system of the present invention, the MFP 100 of FIG. 1 is connected to an authentication server 200 as an authentication device via a LAN 400. Network devices having network communication functions, such as copy machine 301, a printer 302, a FAX machine 303, a scanner 304, and a PC (personal computer) 305, are connected to the LAN 400.

An example of the authentication server 200, in the case of hardware, may be an existing computer including a CPU, a ROM, a RAM, an HDD, and a network I/F. If such a computer is used as the authentication server 200, the CPU of the computer executes predetermined programs stored in a ROM and HDD thereof so as to make the computer serve as a server device. The authentication server 200 manages user account information used within the LAN 400 using a SAM (Security Account Manager) database. As the SAM database stores user accounts together with groups to which users belongs, the authentication server 200 is able to authenticate the users based on user identification information, such as user names and passwords, and identify the groups to which the users belong.

The authentication server 200 has not only a function for authenticating users in response to a request from the network devices on the LAN 400, but also a function for reporting the names of groups to which the users belong. Therefore, the network devices such as the MFP 100 and the PC 305 can, without managing user names and passwords of the users by themselves, authenticate the users by using the user accounts managed by the authentication server 200 and acquire information of the groups to which the users belong. That is, by only changing a user account in the authentication server 200, the network devices using the user account can use the changed user account.

Figure 3:
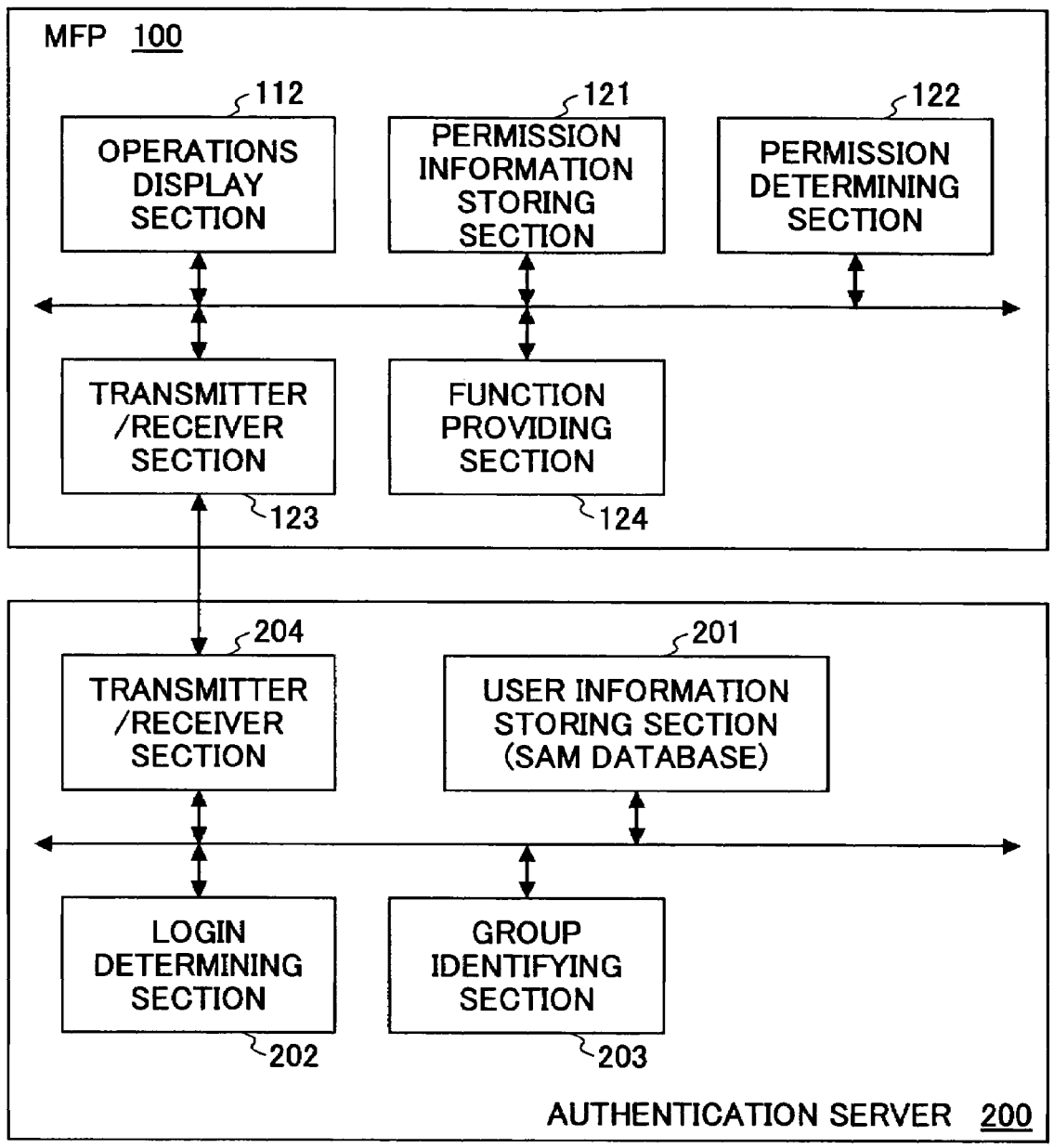
FIG. 3 is a functional diagram illustrating a part of the MFP and an authentication server.

FIG. 3 is a functional diagram showing a part of the MFP 100 and the authentication server 200 which is characteristic of this embodiment. In FIG. 3, those parts not characteristic of this embodiment are not shown. Arrows shown in FIG. 3 indicate information flow in the MFP 100 and the authentication server 200, and do not represent physical components.

As shown in FIG. 3, the authentication server 200, as sections characteristic of this embodiment, includes a user information storing section 201, a login determining section 202, a group identifying section 203, and a transmitter/receiver section 204.

The user information storing section 201, serving as the above-described SAM database, stores identification information indicating users, and group information indicating groups to which the users belong. The user information storing section 201 may be provided, in the case of hardware, in a storage unit such as an internal HDD or in an external storage unit.

The login determining section 202 acquires, in response to a user authentication request from one of the network devices via the LAN 400, identification information (a user name and a password in this embodiment) to be used for authentication from the network device, and authenticates the user by comparing the identification information with information stored in the user information storing section 201. If the login determining section 202 determines that the user has access permission to the authentication server 200, the login determining section 202 may permit the user to login the authentication server 200.

If acquisition of information indicating a group to which the user authenticated by the login determining section 202 belongs is requested, the group identifying section 203 acquires the information of the group to which the user belongs from the user information storing section 201 and sends the information to the source of the request. It is preferable to confirm whether the source of the request has permission to have the information before sending the information.

The transmitter/receiver section 204 has a function for transmitting and receiving information among the external network devices. Requests from/to the above-described sections are transmitted and received via the transmitter/receiver section 204.

The MFP 100 includes, as sections characteristic to this embodiment, the operations display section 112, a permission information storing section 121, a permission determining section 122, a transmitter/receiver section 123, and a function providing section 124.

The operations display section 112, as mentioned above, has a function for accepting requests for use of functions of the MFP 100 as well as various operations such as user name and password input, and a function for displaying screens for accepting such requests and operations.

The permission information storing section 121 stores use permission information indicating the type of functions of the MFP 100 of which permission for use is granted to users. The use permission information is stored on a per-group basis, and groups used herein are those used in the SAM database by the authentication server 200 for classifying users. The use permission information to be stored in the permission information storing section 121 may be set by various methods. For example, the use permission information may be input from the operations display section 112, may be edited using a template downloaded from an external network device such as the authentication server 200, or may be created by downloading only the name of groups from an external device and setting the type of functions to be permitted to be used to each of the groups.

The permission determining section 122 determines the scope of permission granted to a user trying to use the functions of the MFP 100. For example, when the user tries to use a function of the MFP 100, the user is required to input his/her user name and password in the operations display section 112. The input user name and password are transmitted to the user authentication server 200 so as to authenticate the user and acquire information indicating a group to which the user belongs. Then, the permission determining section 122 makes determination by referring to the use permission information managed on a per-group basis in the permission information storing section 121 based on the acquired group information.

The above-described functions of the use permission storing section 121 and the permission determining section 122 are the primary characteristics of this embodiment.

The transmitter/receiver section 123 has a function for transmitting and receiving information among the external network devices such as the authentication server 200. The permission determining section 122 transmits login requests and receives group information through the transmitter/receiver section 123.

The function providing section 124 provides various functions, such as copier, printing, and scanning functions, within the scope of permission granted to users that is determined by the permission determining section 122.

Figure 4C:
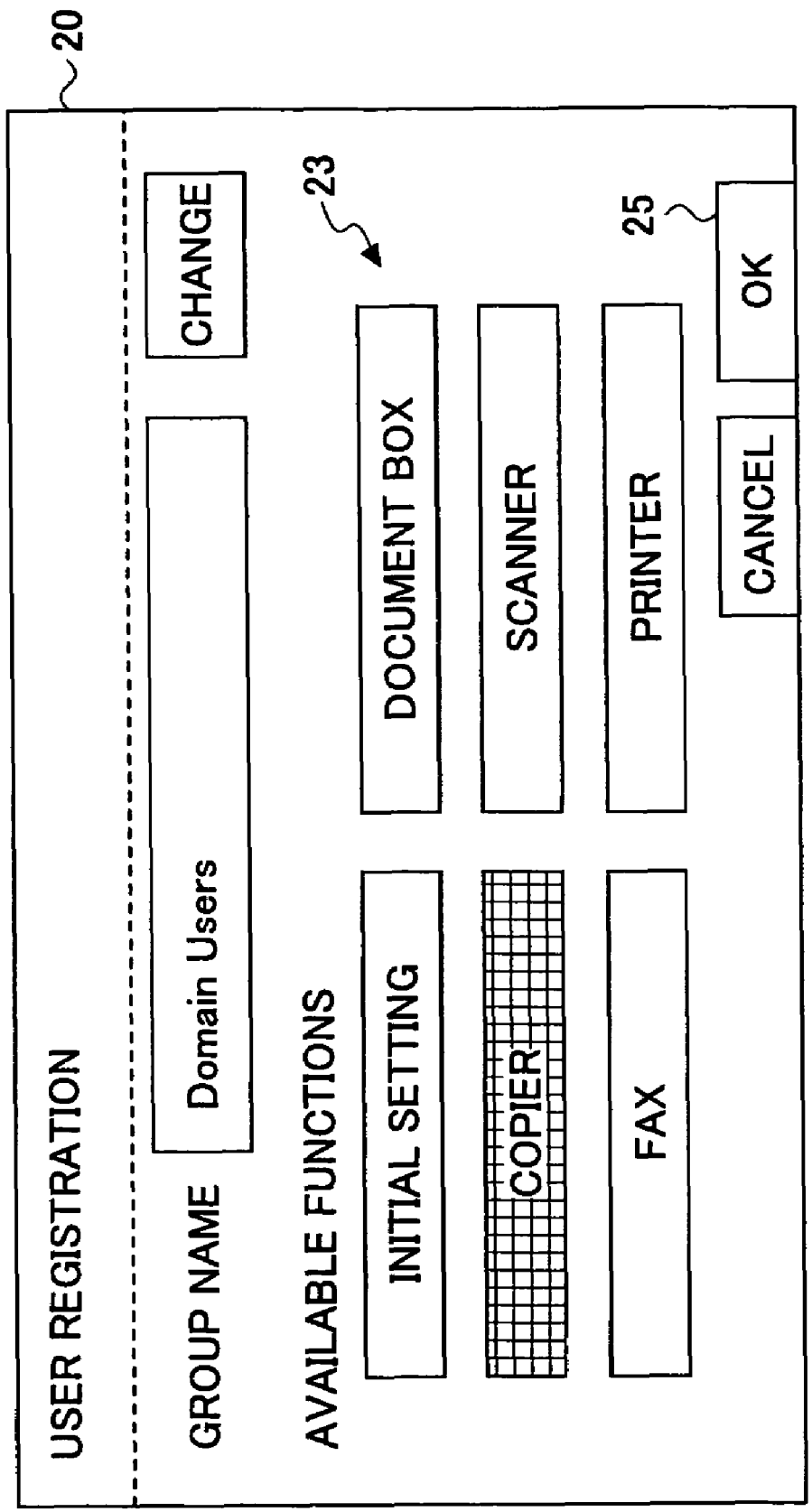

FIGS. 4A-4C illustrate a permission setting screen 20 and a copy permission setting screen 30 used for accepting input of use permission information in the operations display section 112 of the MFP 100 so as to store the input into the permission information storing section 121.

When a user who is permitted to set use permission information requests to set the use permission information, the MFP 100 shows the permission setting screen 20 of FIG. 4A in the operations display section 112 so as to accept input of the use permission information. This function of accepting the use permission information is one of the functions provided by the function providing section 124.

The name of a group for which the user wants to set the use permission is input in a group name input field 21 on the permission setting screen 20. If a "change" key 22 is pressed, the MFP 100 accesses the authentication server 200 to acquire information about groups used for user management by the authentication server 200 and shows a list of the groups. The user selects one of the groups on the list for which the user wants to set the use permission information, so that the name of the selected group is input in the group name input field 21.

Keys corresponding to the functions of the MFP 100 are provided in a function selecting section 23. When the user presses one of the keys corresponding to the function of which permission for use the user wants to grant to users who belongs to the group specified in the group name input field 21, the copy permission setting screen 30 of FIG. 4B is displayed for setting the permission for use of that function in more detail. An initial setting function corresponding to an "initial setting" key shown in the permission setting screen 20 is used for configuring basic settings of the MFP 100, such as permission settings on the permission setting screen 20, and settings of network communications.

If an "OK" key 25 is pressed, the settings specified in the permission setting screen 20 are applied and stored into the permission information storing section 121. If a "cancel" key 24 is pressed, the settings specified in the permission setting screen 20 are canceled and not stored in the permission information storing section 121.

In short, the user inputs the name of a desired group in the group name input field 21, selects the type of permission to be granted to the group by pressing the keys in the function selecting section 23, and presses the "OK" key 25. Thus, the use permission information of the desired group is set and stored into the permission information storing section 121.

FIG. 4B is the copy permission setting screen 30 that appears when a copier function is selected.

On the copy permission setting screen 30, colors to be permitted to be used for copying can be specified by using keys in a color specifying section 32. In the example shown in FIG. 4B, toggle keys corresponding to "while and black", "one color", "two color", and "full color" copier functions are provided for individually specifying whether to permit the use of these functions, and the first two functions are permitted to be used.

In a number of copies specifying section 33, whether to limit the number of copies can be specified by selecting either one of a "no limit" key or a "limited" key. If the "limited" key is selected, the number of copies to be permitted is input in an input field at the right side of the "limited" key. In the example showing FIG. 4B, the number of copies is limited to 100.

A tray permitted to be used for copying can be specified using keys in a tray specifying section 34. In the example shown in FIG. 4B, toggle keys corresponding to a "tray 1", a "tray 2", and a "manual feed tray" are provided for individually specifying whether to permit the use of these trays, and the first two trays are permitted to be used.

If an "OK" key 36 is pressed, information about permitted copy-related functions is temporarily stored and the screen returns to the permission setting screen 20. In this state, a "copier" key in the permission setting screen 20 is shown in gray, indicating that detailed settings of the copier function are configured.

Then, by pressing the "OK" key 25, the configured settings are applied and stored into the permission information storing section 121. If one of the keys in the function selecting section 23 is selected again, permission for use of a corresponding function can be added or deleted.

If a "cancel" key 35 is pressed in the copy permission setting screen 30, the screen returns to the permission setting screen 20 without storing the settings specified in the copy permission setting screen 30. In this case, since the settings of the copier function are canceled, the screen returns to a state shown in FIG. 4A.

By taking the steps described above, the user with the permission to set use permission information can set use permission information for each group in the MFP 100. The settings specified in the MFP 100 may be effective only for the MFP 100, and not effective for other network devices.

The items for which permission for use is specified on the permission setting screen 20 and screens that appear in response to a selection in the function selecting section 23 may be determined based on functions that the function providing section 124 can provide. The permission may be set only by specifying basic functions, such as a copier function and a printer function, without configuring detailed settings of the basic functions. In that case, detailed settings screens such as the copy permission setting screen 30 are not required.

The following describes operations performed by the MFP 100 when the user tries to use the MFP 100, and operations performed by the authentication server 200 in response to the operations of the MFP 100.

Figure 5:
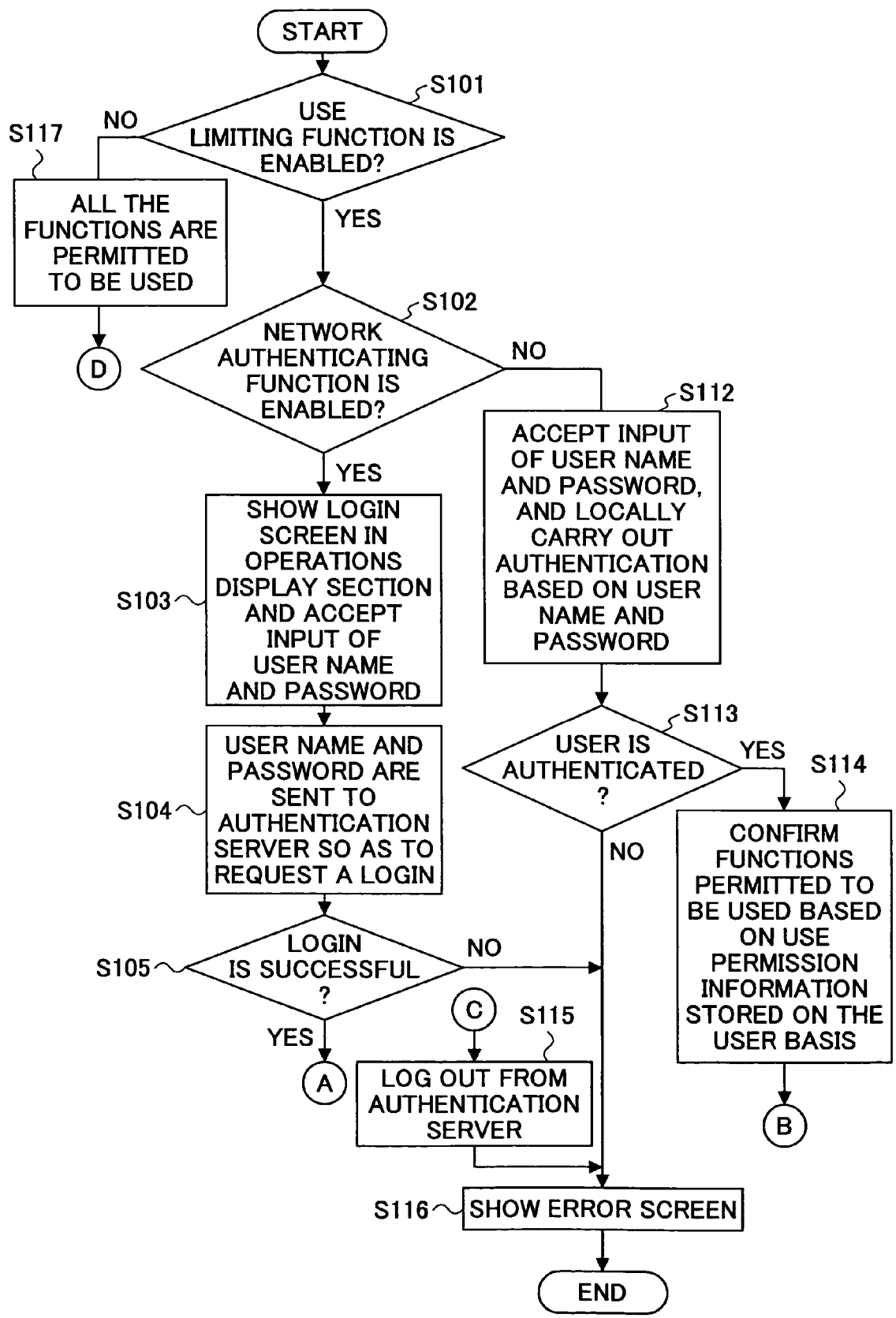
FIGS. 5 and 6 are flowcharts illustrating operations performed by the MFP of FIG. 3 when a user tries to use the MFP.
Figure 6:
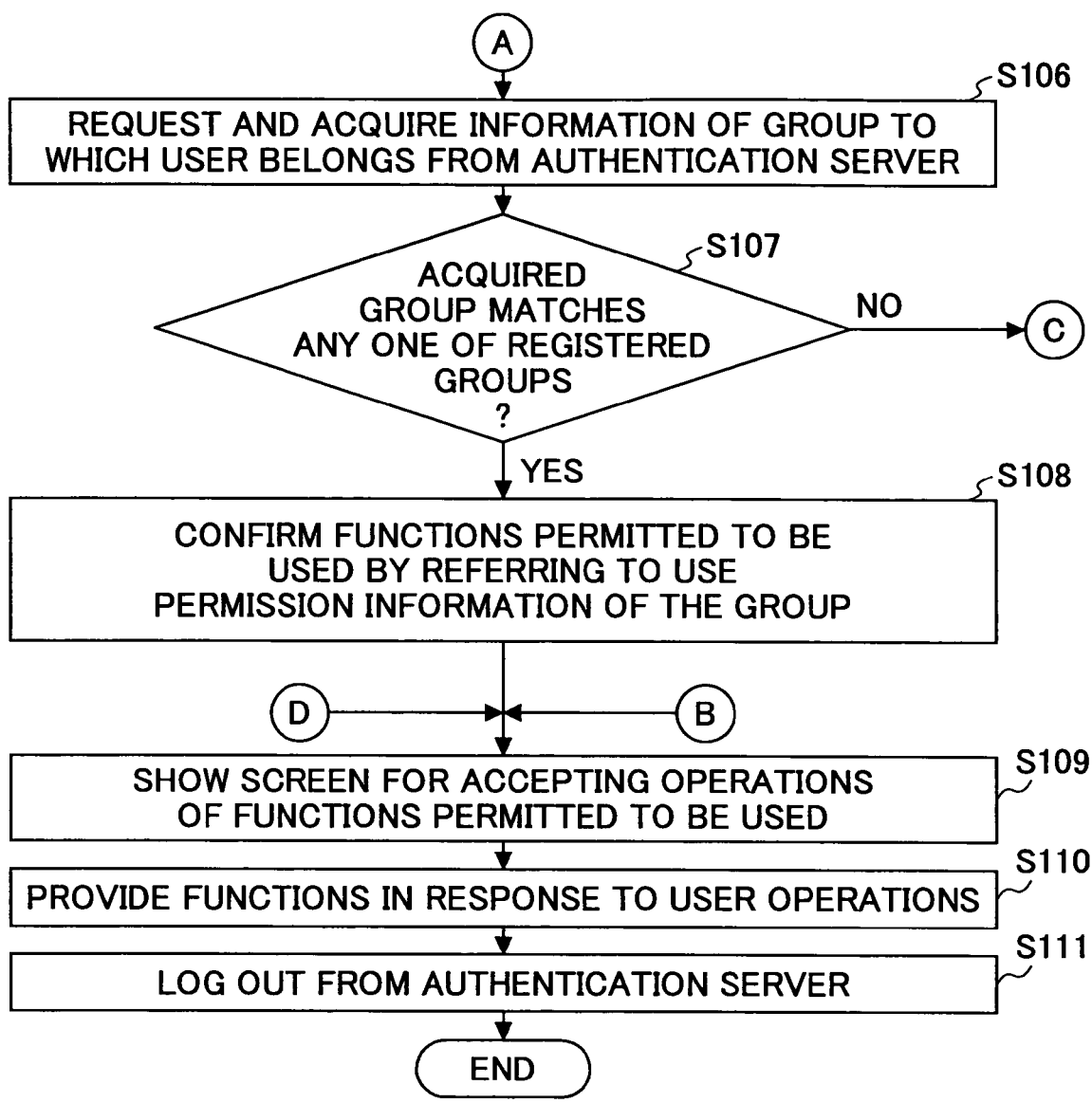

FIGS. 5 and 6 show the operations performed by the MFP 100.

When the CPU 101 of the MFP 100 detects a request for use of the MFP 100 from the user through user operations in the operations display section 112, the CPU 101 of the MFP 100 starts the operations shown in a flowchart of FIG. 5 by executing a predetermined program.

In step S101, it is determined whether a use limiting function for limiting the use of the MFP 100 is enabled based on the use permission information. If the use limiting function is enabled, the process proceeds to step S102 to determine whether a network authenticating function, which involves the use of the authentication server 200, for authenticating users is enabled. If the network authenticating function is enabled, the process proceeds to step S103 to perform authentication and permission management operations with the use of the authentication sever 200.

In step S103, a login screen 40 is shown in the operations display section 112 so as to prompt the user to input the name of the user and a password.

Figure 7:
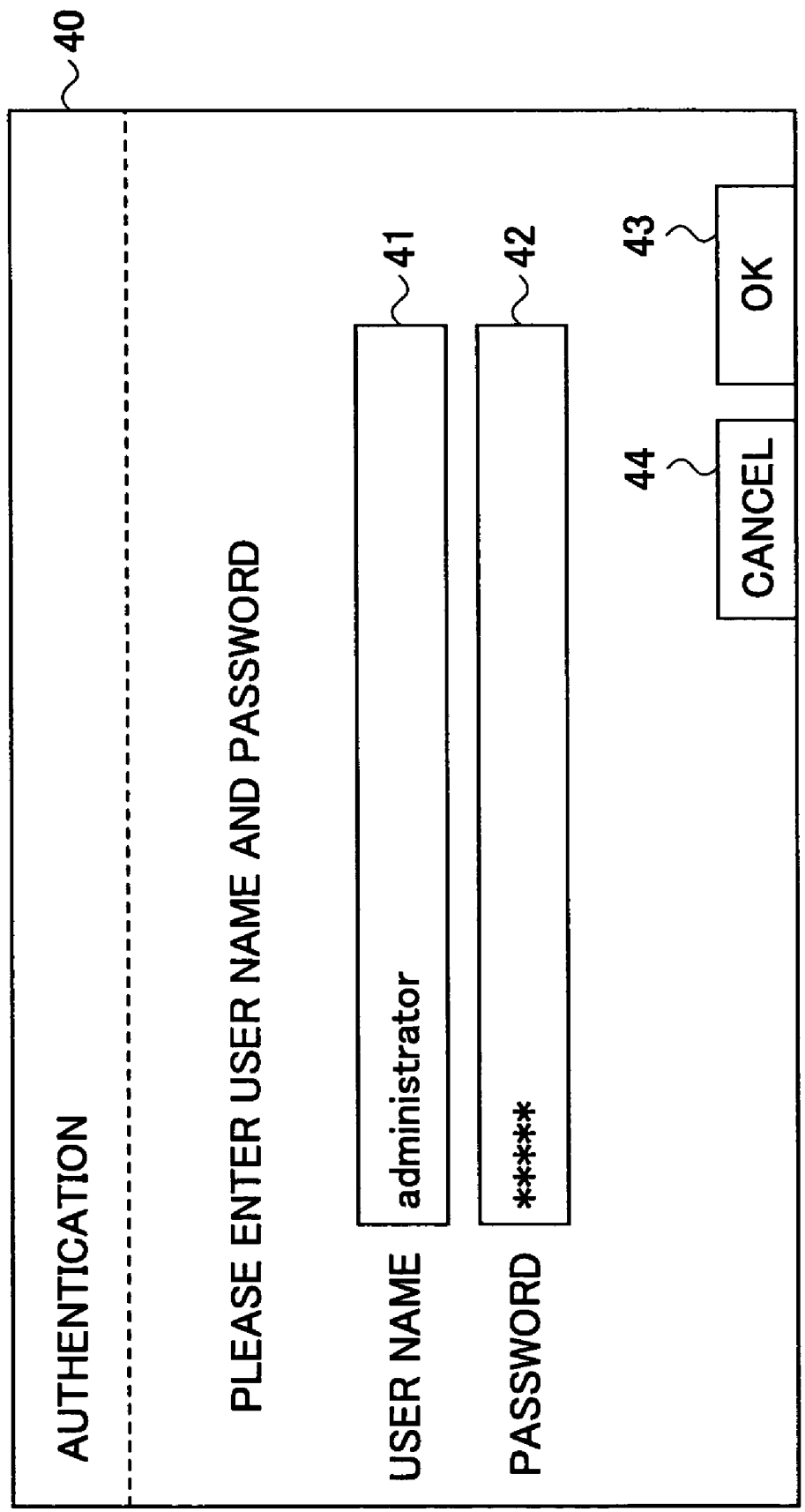
FIG. 7 is an example of a login screen used in the operations shown in FIG. 5.

FIG. 7 shows an example of the login screen 40.

The login screen 40 accepts input of the user name and password in a user name input field 41 and a password input field 42, respectively. When the user inputs the user name and password and presses an "OK" key 43, the input password is entered. Then, the process proceeds to step S104. If the user presses a "cancel" key 44, the use of the MFP 100 is not permitted. Accordingly, the process proceeds to step S116 to display an error screen (not shown).

After step S103, the user name and password input in step S103 are transmitted to the authentication server 200 so as to request a login (step S104). Then in step S105, it is determined whether the login is successful. If the login is successful, the process proceeds to step S106 (FIG. 6), the MFP 100 requests and acquires the information indicating a group to which the authenticated user belongs from the authentication server 200.

Then in step S107, it is determined whether the group acquired in step S106 matches any one of the groups whose use permission information is registered in the MFP 100. This determination may be made based on the information stored in the permission information storing section 121. If the acquired group does not match any one of the registered groups, the user who has requested the use is not permitted to use the MFP 100. Accordingly, the process proceeds to step S115 (FIG. 5) to log out from the authentication server 200 and then to step S116 to display the error screen, and thus the operation is ended. It is possible to receive another request for use of the MFP 100 after ending the operation.

On the other hand, if in step S107 the acquired group matches one of the registered groups, the MFP 100 confirms functions permitted for the user who has requested the use of the MFP 100 by referring to the use permission information of the matching group in step S108. According to this embodiment, in the case where the user belongs to plural groups having different permission information, the user selects one of the groups. However, other methods may be applicable, which are described in modifications described below.

In step S109, the operations display section 112 shows a screen for accepting operations of the functions that the user is permitted to use. In this screen, only keys corresponding to the functions permitted to be used may be displayed while keys corresponding functions not permitted to be used may be hidden. Alternatively, the keys corresponding to the functions not permitted to be used may be displayed faintly.

Then in step S110, the MFP provides functions to the user in response to user operations on the screen. Finally, the operation ends by logging out from the authentication server 200.

If in step S102 the network authenticating function is determined as not enabled, authentication is performed without using the authentication server 200. In that case, the process proceeds to step S112 where the MFP 100 accepts input of the user name and password, and locally carries out authentication based on the input user name and password. A screen used for accepting the input may be the same one as shown in FIG. 7.

Then in step S113, it is determined whether the user is authenticated. If the user is authenticated, the process proceeds to step S114 to confirm functions permitted to the user who has requested the use by referring to corresponding use permission information stored on a per-user basis. Then, the process proceeds to step S109 (FIG. 6) to continue operations thereafter.

If in step S113 the user is determined as not authenticated, the user who has requested the use is not permitted to use the MFP 100. Accordingly, the process proceeds to step S116 to display the error screen and ends the operations.

If in step S101 the use permission limiting function is not enabled, all the functions are to be permitted to the user who has requested the use. Accordingly, the MFP 100 determines that all the functions are permitted to be used (step S117), and the process proceeds to step S109 (FIG. 6) to continue operations thereafter.

The operations performed in step S104-S108 correspond to an embodiment of a use permission determining method according to present invention. The CPU 101 serves as a transmitting unit in the operations performed in step S104 and as a determining unit in the operations performed in step S107-S109.

Figure 8:
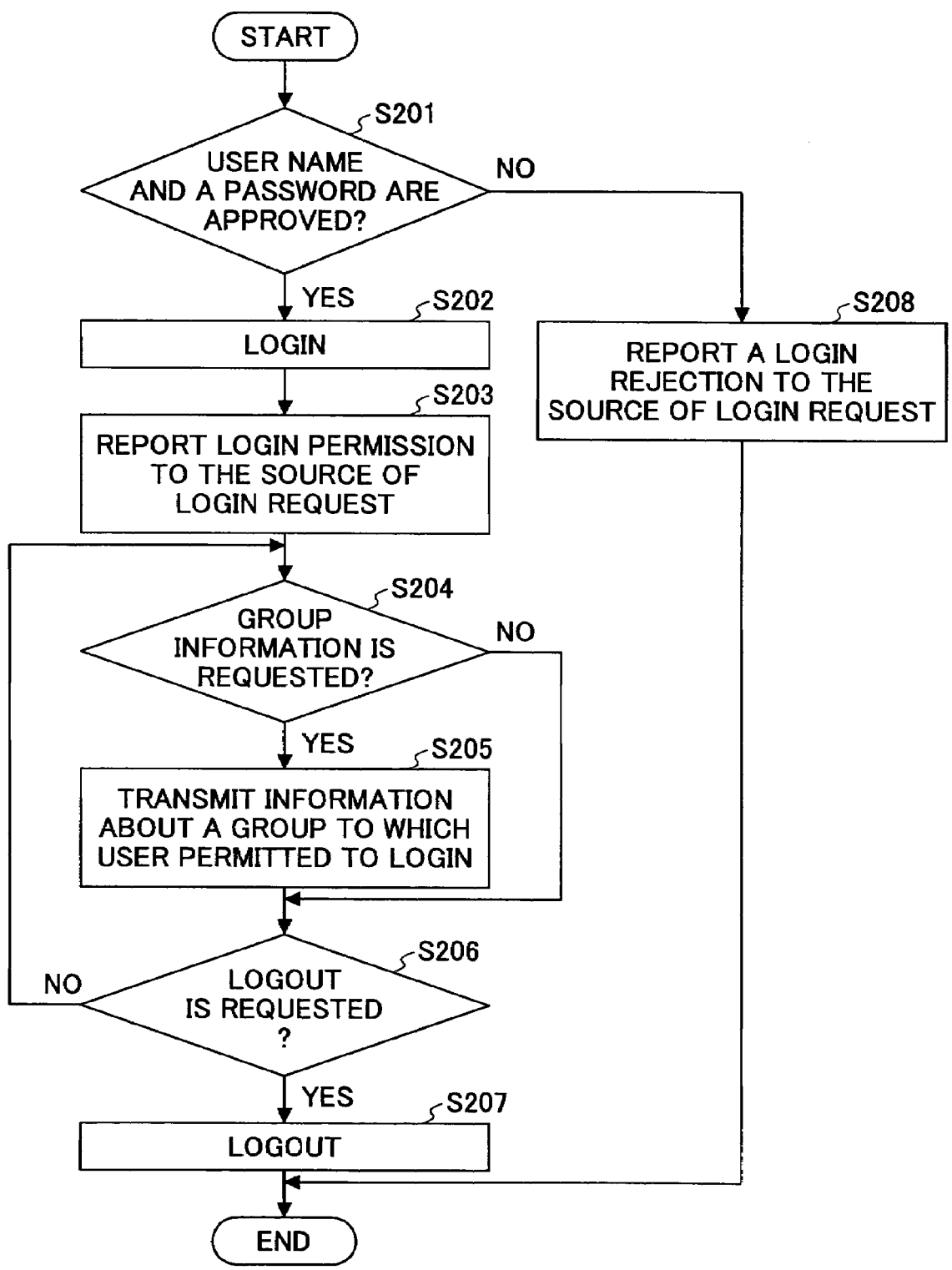
FIG. 8 is a flowchart illustrating operations performed by an authentication server in response to the operations shown in FIGS. 5 and 6.

FIG. 8 is a flowchart illustrating operations performed by the authentication server 200 in response to the operations shown in FIGS. 5 and 6. FIG. 8 only shows operations related to the operations shown in FIGS. 5 and 6, and does not show other general operations.

When the authentication server 200 receives a login request from the external network devices such as the MFP 100, the CPU of the authentication server 200 starts the operations illustrated in the flowchart of FIG. 8 by executing a predetermined program.

In step S201, it is determined whether a user name and a password received together with the login request are approved. This determination may be made based on the information stored in the user information storing section 201.

If the username and password are determined as approved, the process proceeds to step S202 to perform a login, and then to step S203 to report login permission to the source of the login request.

Then in step S204, it is determined whether group information is requested. If the group information is requested, information indicating a group to which a user permitted to login is transmitted (step S205). Then the process proceeds to step S206. This information indicating the group may also be acquired from the user information storing section 201. If in step S204 the group information is not requested, the process proceeds directly to step S206.

If a logout is requested in step S206, the process proceeds to step S207 to perform a logout and ends the operations. If a logout is not requested, the process returns to step S204 to repeat the operations.

On the other hand, if the user name and password are not approved in step S201, the process proceeds to step S208 to report a login rejection to the source of the login request and ends the operations.

The operations described above also correspond to an embodiment of the use permission determining method according to the present invention. The CPU of the authentication server 200 serves as a transmitting unit in these operations.

The above described operations by the MFP 100 and the authentication server 200 realize the permission management using the information indicating to which groups the individual users belong as described referring to FIG. 3. In this network system, the information indicating to which groups the individual users belong can be centrally managed in the authentication server 200 and shared by many network devices. Meanwhile, the information indicating the type of permission granted to users of the individual groups can be set in each of the devices.

Accordingly, an operator of the authentication server 200 does not need to know detailed settings of the individual network devices. On the other hand, operators of the network devices can set permission for use of the network devices as long as the operators can know groups to which users belong even if they do not know details of data management in the authentication server 200. As the permission can be set on a per-group basis, the number of items to be set can be reduced even if there are a large number of users. Therefore, permission setting operations in each of the devices do not result in such a large workload. High knowledge in networks is not required for setting the use permission. Accordingly, in the permission management as described above, use permission of each user can be easily set even if many network devices are used.

In the network system having the functions as described above, there is no need to change the permission information stored in the authentication server even when a group permitted to use a network device needs to be changed because of a movement of the network device from one department to another department, or when permission information needs to be set for a newly added network device. Therefore, the above-described network system is especially effective in an environment where such needs frequently arise.

The MFP 100 may not have a local authentication function used in step S112-S114 of FIG. 5.

Figure 9:
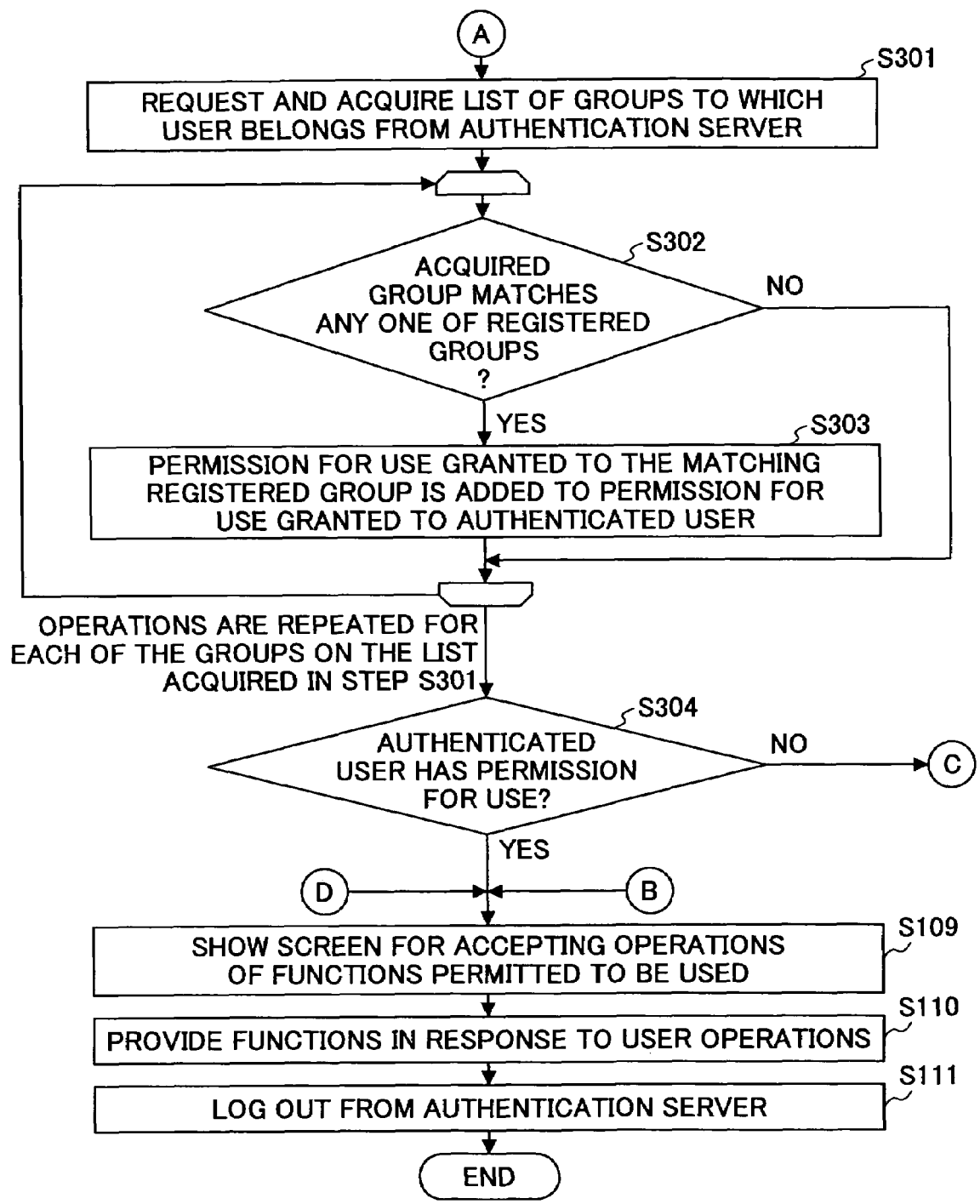
FIG. 9 is a flowchart illustrating operations corresponding to the operations shown in FIG. 6 according to a first modification of the above-described embodiment of the present invention.

[First Modification: FIG. 9]

This section provides a first modification of the above-described embodiment of the present invention. This modification is different from the above-described embodiment only in handling a user belonging to plural groups. Accordingly, operations performed by the CPU 101 of the MFP 100 when the user tries to use the MFP 100 in this modification are different from those in the above-described embodiment only in a part shown in FIG. 6, which is described below.

FIG. 9 is a flowchart that illustrates the operations corresponding to the operations of FIG. 6 according to this modification.

According to the first modification, if the login is successful in step S105 of FIG. 5, the process proceeds to step S301 of FIG. 9 wherein the MFP 100 requests and acquires a list of the groups to which the user belongs from the authentication server 200.

In step S302, it is determined whether one of the acquired groups matches any one of the groups whose use permission information is registered in the MFP 100. If the acquired group matches any one of the registered groups, use permission granted to the matching registered group is added to the use permission of the user authenticated by the authentication server 200 (or the user who has requested the use of the MFP 100) in step S303. These operations of steps S302 and S303 are repeated for each of the groups on the list.

The determination in step S302 may be made based on the information stored in the permission information storing section 121. At the time when step S301 is performed, the authenticated user does not have any permission for use.

Accordingly, in the case where a user belongs to plural groups, the user is permitted to use a function of which permission for use is granted to at least one of the groups in the loop of steps S302 and S303.

Then in step S304, it is determined whether the authenticated user has permission for use of one or more of the functions. If the user has permission for use, the process proceeds to step S109 to continue operations thereafter so as to provide corresponding functions to the user. If the user does not have any permission for use, the process proceeds to step S115 of FIG. 5 to continue operations thereafter so as to end the operations without permitting the user to use the MFP 100.

The operations performed in step S109 and the steps that follow and in step S115 and the steps that follow are the same as those in the above-described embodiment, and are not described herein.

With the above-described operations, even if a user belongs to plural groups, the MFP 100 provides functions thereof according to the use permission granted to each of the groups. Therefore, the use permission can be set more flexibly.

Figure 10:
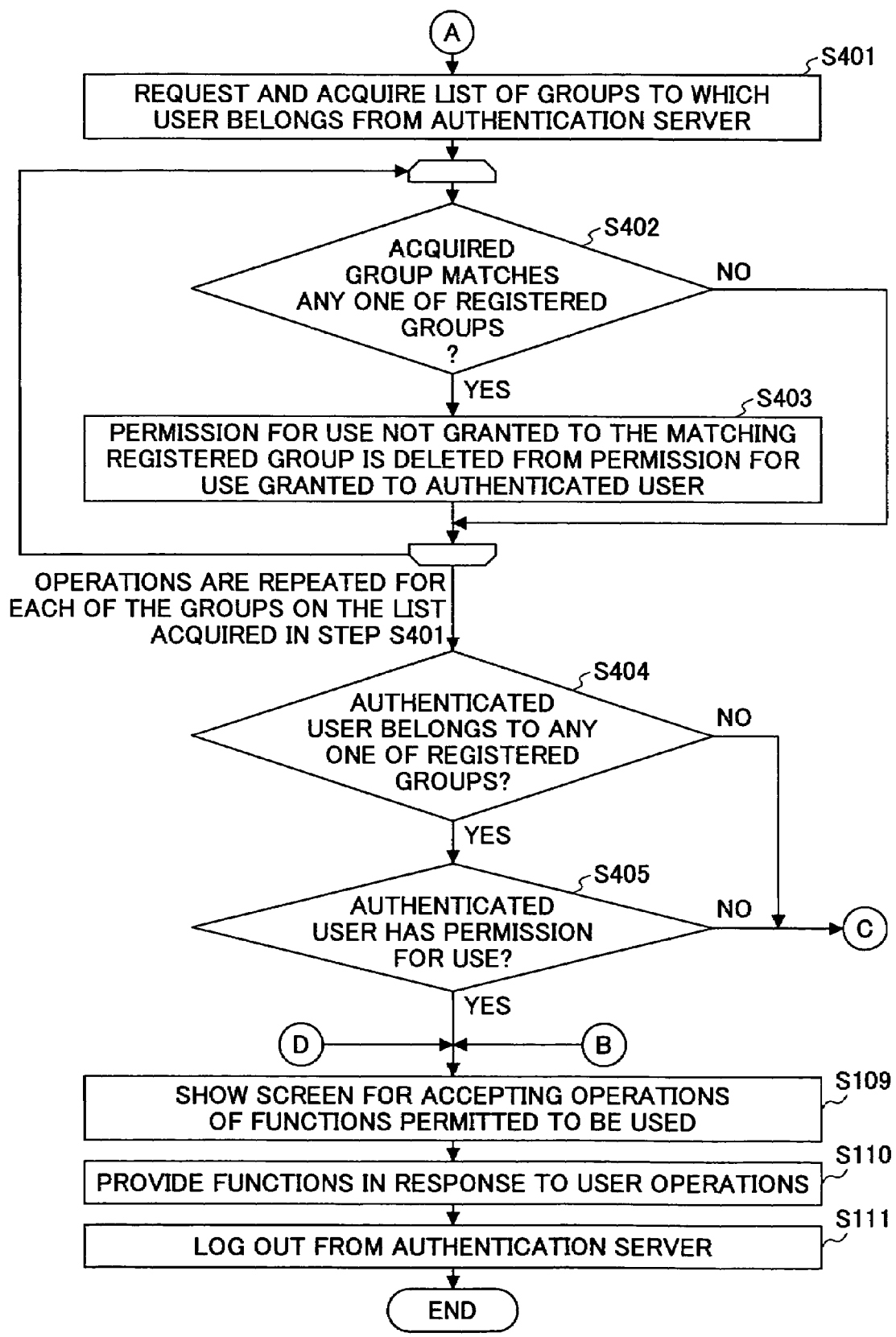
FIG. 10 is a flowchart illustrating operations corresponding to the operations shown in FIG. 6 according to a second modification of the above-described embodiment of the present invention.

[Second Modification: FIG. 10]

This section provides a second modification of the above-described embodiment of the present invention. This modification is also different from the above-described embodiment only in handling a user belonging to plural groups. Accordingly, operations performed by the CPU 101 of the MFP 100 when the user tries to use the MFP 100 in this modification are different from those in the above-described embodiment only in a part shown in FIG. 6, which is described below.

FIG. 10 is a flowchart that illustrates the operations corresponding to the operations of FIG. 6 according to this modification.

According to the second modification, if the login is successful in step S105 of FIG. 5, the process proceeds to step S401 of FIG. 10 wherein the MFP 100 requests and acquires a list of the groups to which the user belongs from the authentication server 200.

In step S402, it is determined whether one of the acquired groups matches any one of the groups whose use permission information is registered in the MFP 100. If the acquired group matches any one of the registered groups, use permission not granted to the matching registered group is deleted from the use permission of the user authenticated by the authentication server 200 (or the user who has requested the use of the MFP 100) in step S403. These operations of steps S402 and S403 are repeated for each of the groups on the list.

The determination in step S402 may be made based on the information stored in the permission information storing section 121. At the time when step S401 is performed, the authenticated user has permission for use of all the functions.

Accordingly, in the case where a user belongs to plural groups, the user is permitted to use a function of which permission for use is granted to all the groups in the loop of steps S402 and S403.

In step S404, it is determined whether the authenticated user belongs to any one of the groups whose use permission information is registered in the MFP 100. If the user does not belong to any one of the groups, the use of the MFP 100 is not permitted. Accordingly, the process proceeds to step S115 of FIG. 5 to continue operations thereafter so as to end the operations without permitting the user to use the MFP 100. Step S404 is provided in order to prevent a user who does not belong to any one of the groups whose use permission information is registered in the MFP 100 from having permission for use of all the functions.

If yes in step S404, the process proceeds to step S405 to determine whether the authenticated user has permission for use of one or more of the functions. If the user has permission for use, the process proceeds to step S109 to continue operations thereafter so as to provide corresponding functions to the user. If the user does not have any permission for use, the process proceeds to step S115 of FIG. 5 to continue operations thereafter so as to end the operations without permitting the user to use the MFP 100.

The operations performed in step S109 and the steps that follow and in step S115 and the steps that follow are the same as those in the above-described embodiment, and are not described herein.

With the above-described operations, even if a user belongs to plural groups, the MFP 100 provides functions thereof according to the use permission granted to each of the groups. Therefore, the use permission can be set more flexibly. The scope of the use permission granted to the user belonging to the plural groups in the second modification is generally narrower compared to the first modification.

Figure 11:
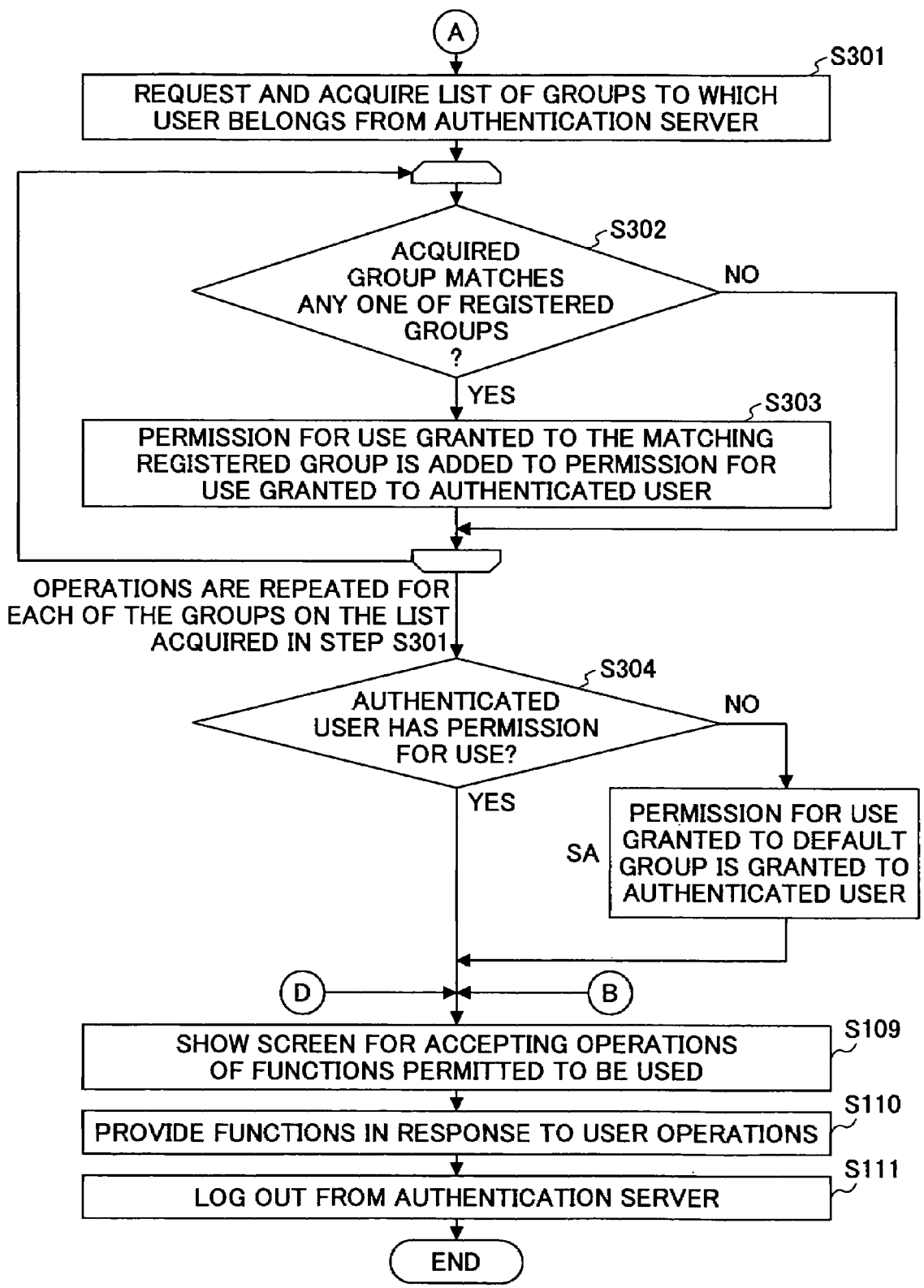
FIG. 11 is a flowchart illustrating operations corresponding to the operations shown in FIG. 6 according to a third modification of the above-described embodiment of the present invention.
Figure 12:
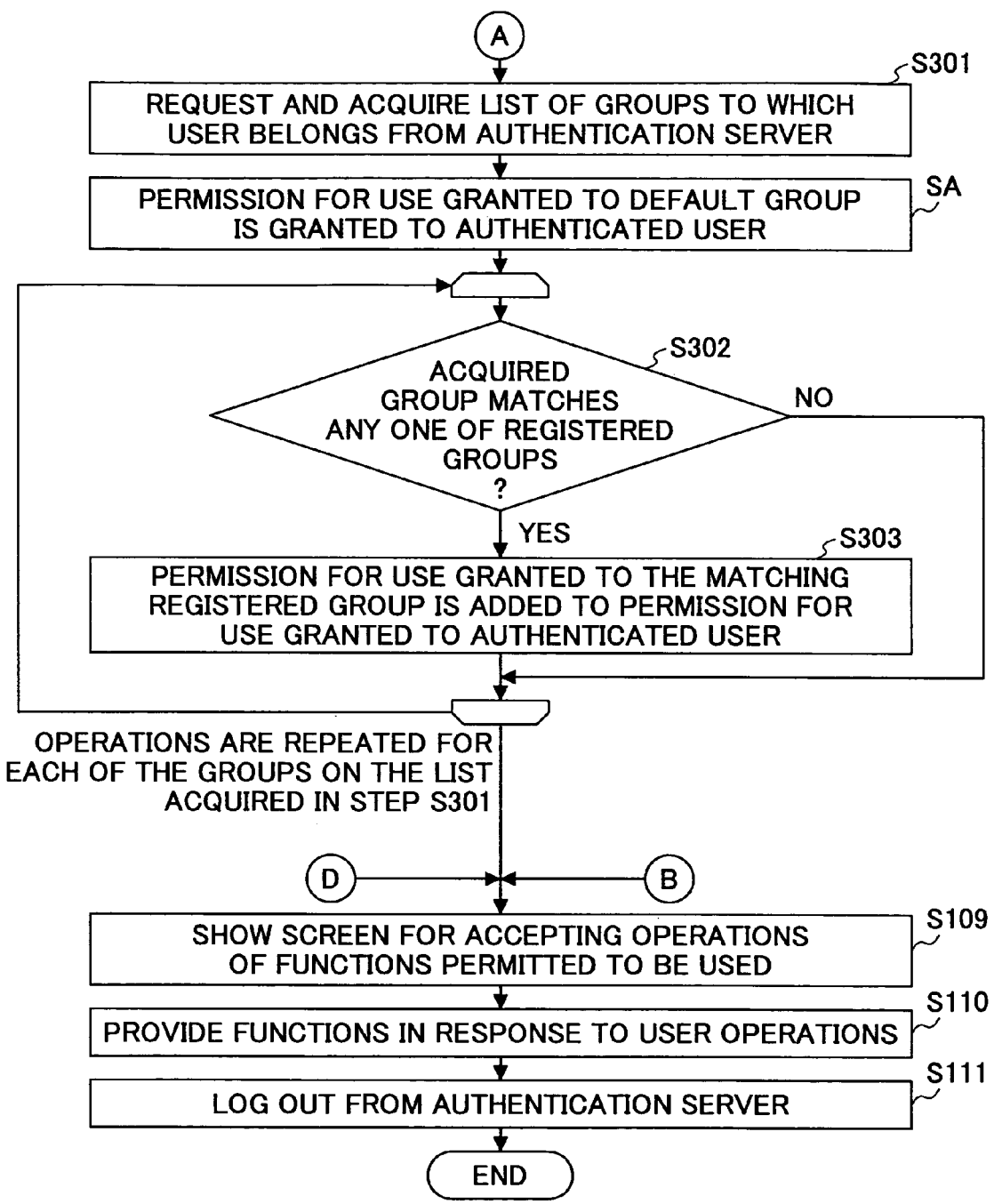
FIG. 12 is a flowchart illustrating another example of the operations shown in FIG. 11.

[Third Modification: FIGS. 11, 12]

This section provides a third modification of the above-described embodiment of the present invention. This modification is different from the first modification only in that a default group is provided, use permission information of the default group is stored in the permission information storing section 121, and that use permission granted to the default group is permitted to a user who does not have any use permission. Accordingly, operations performed by the CPU 101 of the MFP 100 when the user tries to use the MFP 100 in this modification are different from those in the first modification only in a part shown in FIG. 9, which is described below.

FIG. 11 is a flowchart that illustrates the operations corresponding to the operations of in FIG. 9 according to this modification. These operations also correspond to the operations of FIG. 6.

According to the third modification, operations prior to step S304 performed by the MFP 100 are the same as the operations of the first modification shown in FIG. 9. However, if the authenticated user does not have any use permission in step S304, the use permission granted to the default group is granted to the user (step SA), and then the process proceeds to the step S109 to continue operations thereafter.

With these operations, even if the MFP 100 receives group information indicating that the user does not belong to any group, use permission granted to the default group is granted to the user.

The operations performed in step S109 and the steps that follow are the same as those in the above-described embodiment, and are not described herein.

With the above-described operations, it is possible to grant use permission to all the users by only setting the use permission information for the default group. Permission setting other than permission setting for the default group is required only when there is a group to which a user wants to grant broader use permission than the use permission granted to the default group. Therefore, setting operations are reduced.

It is possible to have similar effects when operations shown in FIG. 12 are performed in place of the operations shown in FIG. 11. In the operations shown in FIG. 12, the operation performed in step SA is performed immediately after step S301. In this case, since the use permission granted to the default group is granted to all the users, step S304 of FIG. 11 is omitted.

Figure 13:
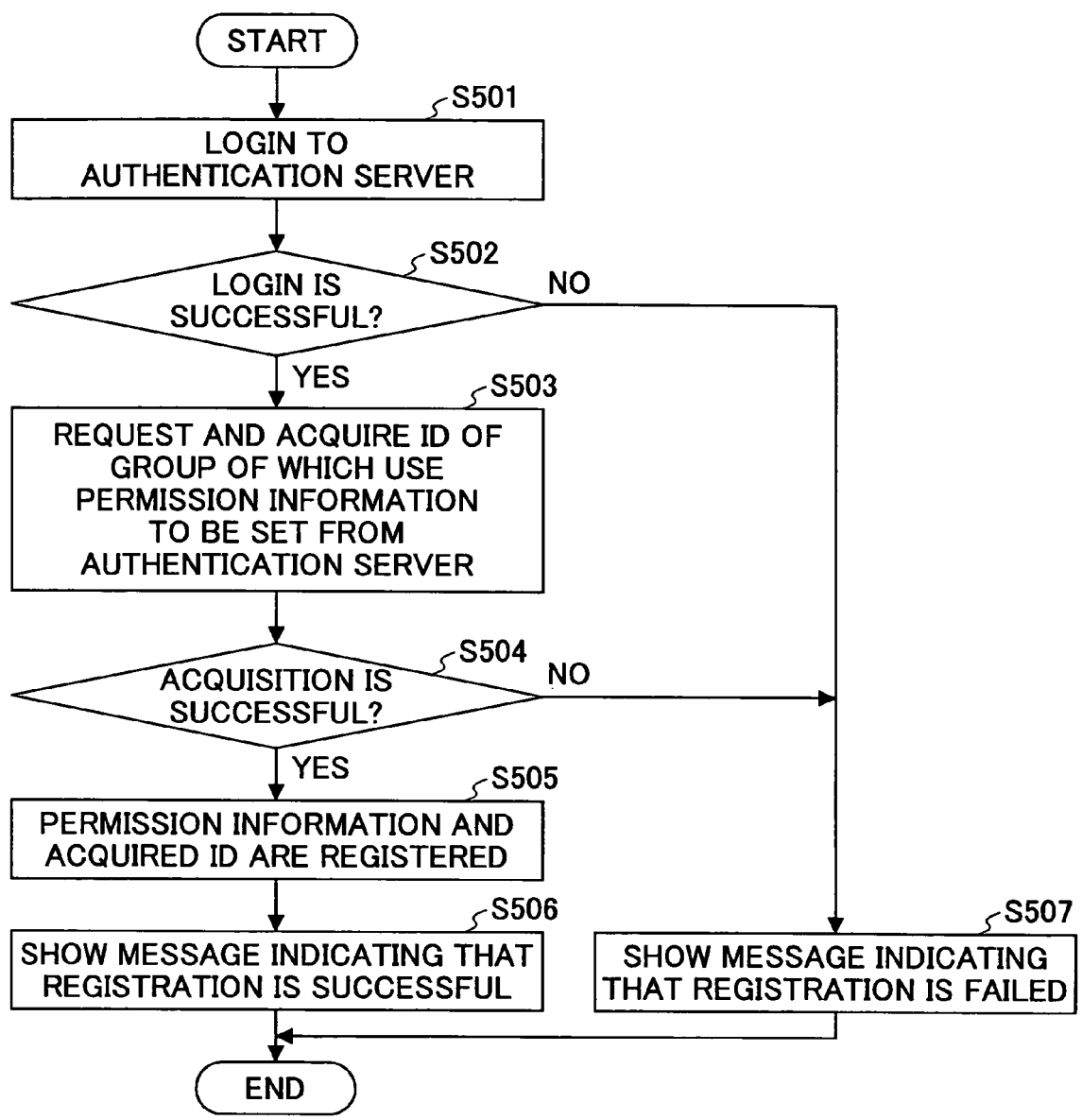
FIG. 13 is a flowchart showing operations performed by an MFP 100 when a user issues an instruction for setting use permission information for a group.
Figure 14:
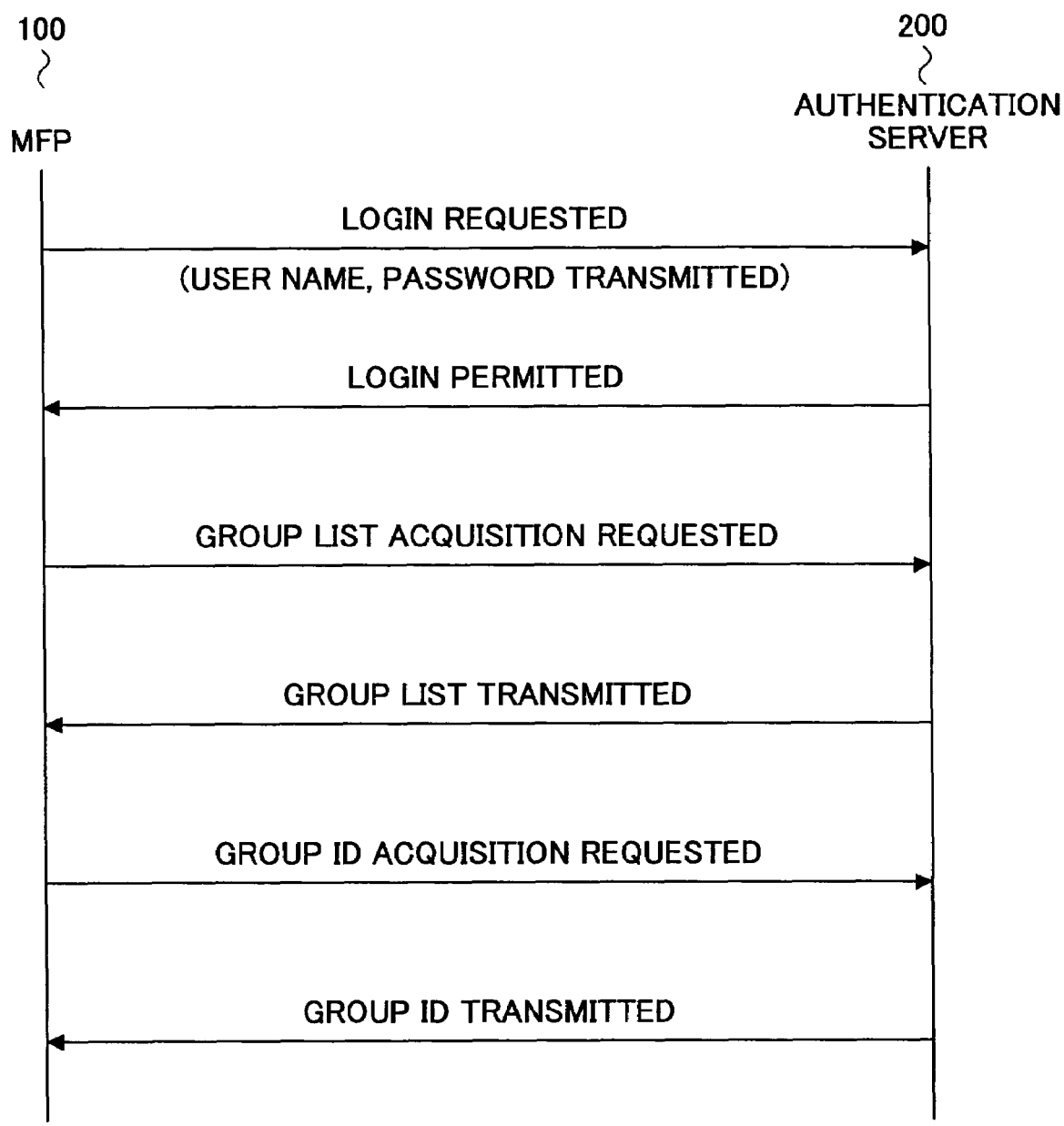
FIG. 14 illustrates a communications sequence performed between a MFP and an authentication server for setting use permission for a group.
Figure 15:
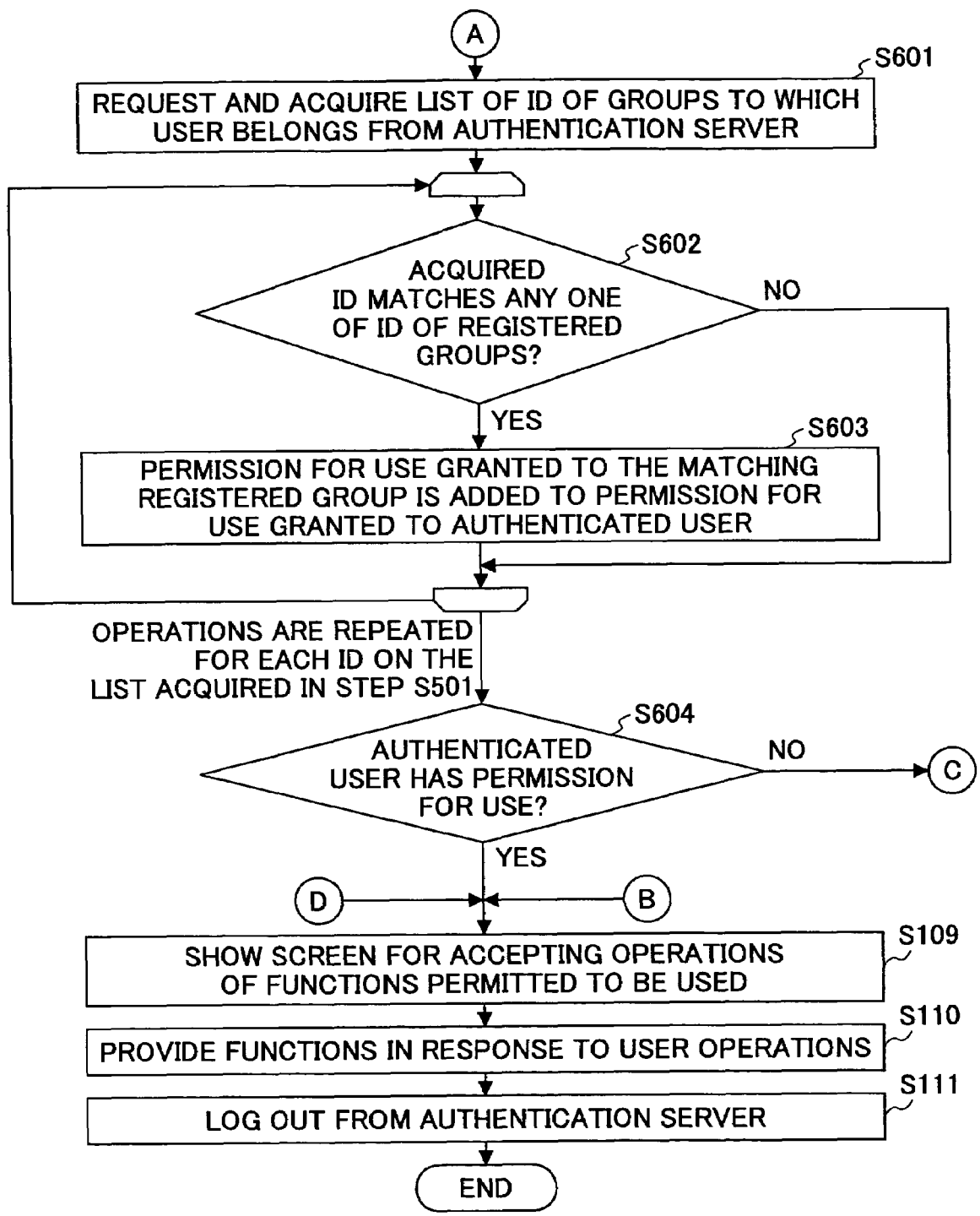
FIG. 15 is a flowchart illustrating operations corresponding to the operations shown in FIG. 6 according to a fourth modification of the above-described embodiment of the present invention.

[Fourth Modification: FIGS. 13-15]

This section provides a fourth modification of the above-described embodiment of the present invention. This modification is different from the first modification only in that group IDs are used in place of group names when comparing information indicating a group to which the user belongs to information about groups whose use permission is registered.

GUIDs (Global Unique Identifiers) and SIDs (Security Identifiers) may be used as the IDs if Windows™ are employed.

The following description describes only operations different from the first modification.

In this modification, upon setting the use permission information of individual groups as described in the above embodiment with reference to FIG. 4, group IDs are registered into the permission information storing section 121 together with the group names.

FIG. 13 is a flowchart illustrating operations for registering the group IDs.

According to this modification, when a user issues an instruction for setting use permission information for a group (e.g. when a user presses the "OK" key 25 in the permission setting screen 20 shown in FIG. 4), the CPU 101 of the MFP 100 starts the operations shown in the flowchart of FIG. 13.

In step S501, a login to the authentication server 200 is performed. The account used for the login may be an account of the user who has issued the instruction or an account of the MFP 100. In step S502, it is determined whether the login is successful. If the login is successful, the MFP 100 requests and acquires an ID of the group for which the user wants to set use permission information from the authentication server 200 in step S503.

As long as the authentication server 200 manages information indicating groups together with corresponding group IDs, the IDs of the groups registered in the authentication server 200 are successfully acquired. However, the group input by the user is not necessarily registered in the authentication server 200. In that case, the acquisition of the group ID fails.

Therefore, in step S504, it is determined whether the acquisition is successful. If the acquisition is successful, the group name and the use permission information are registered in the permission information storing section 121 together with the acquired ID in step S505. Then the operations display section 112 shows a message indicating that the registration is successful (step S506), and the operation is ended.

If the login fails in step S502 or if the acquisition of the group ID fails in step S504, the ID cannot be registered and therefore the registration of the use permission information is canceled. In this case, the operations display section 112 shows a message indicating that the registration has failed (step S507), and the operation is ended.

With the above-described operations, group names and use permission information can be stored in the permission information storing section 121 together with corresponding IDs used for group management by the authentication server 200. That is, use permission information can be registered on a per-ID basis. Accordingly, the group information acquired from the authentication server 200 upon determination of use permission granted to a user may be a group ID, and the determination may be made based on the group ID.

A list of groups and IDs of the groups may be acquired prior to the use permission setting operations such that the MFP 100 allows the setting of use permission information of only the groups registered in the authentication server 200.

In such a case, a communication sequence as shown in FIG. 14 is executed between the MFP 100 and the authentication server 200 upon setting the use permission information of a group.

Since the list of the groups defined in the authentication server 200 and the IDs of the groups are acquired in advance as described above, the user does not need to access the authentication server 200 upon registering the use permission. Moreover, rejection of registration of the use permission information due to failure of the ID acquisition can be avoided.

In the case where the group IDs are used as described above, operations corresponding to the operations of FIG. 9 in the first modification are changed as follows.

FIG. 15 is a flowchart illustrating the operations.

According to the fourth modification, if the login is successful in step S105 of FIG. 5, the process proceeds to step S601 of FIG. 15 wherein the MFP 100 requests and acquires a list of IDs of the groups to which the user belongs from the authentication server 200.

In step S602, it is determined whether one of the acquired IDs matches any one of IDs of the groups whose use permission information is registered in the MFP 100. If the acquired ID matches any one of the IDs of the registered groups, use permission granted to the matching registered group is added to the use permission of the user authenticated by the authentication server 200 (or the user who has requested the use of the MFP 100) in step S603. These operations of steps S602 and S603 are repeated for each of the IDs on the list.

The determination in step S602 may be made based on the information stored in the permission information storing section 121. At the time when step S601 is performed, the authenticated user does not have any permission for use yet.

Then in step S604, it is determined whether the authenticated user has permission for use of one or more of the functions. If the user has permission for use, the process proceeds to step S109 to continue operations thereafter so as to provide corresponding functions to the user. If the user does not have any permission for use, the process proceeds to step S115 of FIG. 5 to continue operations thereafter so as to end the operations without permitting the user to use the MFP 100.

The operations performed in step S109 and the steps that follow and in step S115 and the steps that follow are the same as those in the above-described embodiment, and are not described herein.

In the above-described operations, the group IDs are used for comparing groups. Therefore, even if group names are changed in the authentication server 200 due to, e.g., reorganization of a company, permission can be managed without changing settings in the MFP 100 as long as the group IDs remains unchanged. As the setting operations due to a change of group names are eliminated, the permission management can be simplified.

The above-described embodiments and the modifications may be used by appropriately combining each other's steps as long as no conflicts arise.

It should be understood that the devices included in the network system, hardware configurations of the network devices, data formats, and operations are not limited to the above-described embodiment and modifications.

For example, the network system may comprise at least one network device and one authentication server. The network used for communications is not limited to a LAN, and may be any network channel such as a network connected to Internet, a wired network, and a wireless network.

Although the operations display section 112 of the network device is used for setting the use permission information in the network device, a terminal device, such as a PC, capable of communicating via a network may also be used. In that case, the terminal device accesses the network device by using a web browser. The permission management as described above is also applicable to the case where an external terminal device requests the use of the functions of the network device.

The present invention may be applied to any types of network devices as long as the network devices are capable of acquiring information indicating groups to which users belong from the authentication server 200. Non-exclusive examples of the network devices include image processing devices (printers, fax machines, digital copy machines, scanners, etc.), general-purpose computers, network home appliances, automatic vending machines, medical devices, power supply units, air-conditioning systems, measuring systems (gas meters, water meters, electricity meters, etc.), and automobiles and aircraft having communication functions.

The present invention may be provided in the form of a program executable by a computer for controlling network devices such as the MFP 100. The effects as described above can be obtained by causing the computer to execute the program.

Such a program may be stored in a storage unit, such as a ROM and an HDD, embedded in a computer, or may be recorded in recording media (CD-ROMs, flexible disks, etc.) or non-volatile recording media/memories (SRAMs, EEPROMs, memory cards, etc). The program recorded in such recording media may be installed in a computer or may be read from the media such that a CPU of the computer executes the program to perform the above-described operations.

The program may be downloaded from a network-connected device equipped with a recording medium storing the program or an external device having a storage unit storing the program.

The present application is based on Japanese Priority Application No. 2004-272465 filed on Sep. 17, 2004, with the Japanese Patent Office, the entire contents of which are hereby incorporated by reference.

What is claimed is:

1. A network system comprising:
  a network device configured to perform a plurality of functions; and
  an authentication device;
  wherein the authentication device includes
    a storing unit that stores identification information items indicating users who use the network device, and group information items indicating respective groups to which the users belong; and
    a transmitting unit that transmits, upon receiving from the network device an identification information item indicating one of the users trying to use the network device, a group information item indicating the group to which the user indicated by the received identification information item belongs; and
  the network device includes
    a storing unit that stores use permission information items on a per-group basis, each item indicating which of the plurality of functions of the network device is permitted to be used by a respective group, wherein the storing unit of the network device further stores a use permission information item for a default group, indicating which function is permitted to be used by the default group;
    a transmitting unit that transmits the identification information item indicating the user trying to use the network device to the authentication device; and
    a determining unit that determines which of the plurality of functions of the network device the user trying to use the network device is permitted to use, based on the group information item received from the authentication device and a respective user permission information item stored in the storing unit, wherein if the group information item received from the authentication device indicates that the user trying to use the network device belongs to none of the groups, the determining unit of the network device determines that the user is permitted to use a function permitted to be used by the default group.

2. The network system as claimed in claim 1,
  wherein if the group information item received from the authentication device indicates that the user trying to use the network device belongs to a plurality of the groups, the determining unit of the network device determines that the user is permitted to use a function the use of which is permitted to at least one of the groups to which the user belongs.

3. The network system as claimed in claim 1,
  wherein if the group information item received from the authentication device indicates that the user trying to use the network device belongs to a plurality of the groups, the determining unit of the network device determines that the user is permitted to use only a function the use of which is permitted to all the groups to which the user belongs.

4. The network system as claimed in claim 1, wherein
  the storing unit of the authentication device stores IDs of the groups;
  the transmitting unit of the authentication device transmits, as the group information, the ID of the group to which the user indicated by the received identification information item belongs;
  the storing unit of the network device stores the use permission information items on a per-ID basis; and
  the determining unit of the network device determines which function of the network device the user trying to use the network device is permitted to use, based on the ID of the group received from the authentication device.

5. A use permission determining method implemented on a system including a network device configured to perform a plurality of functions and an authentication device connected over a network, comprising:
  storing, at the authentication device, identification information items indicating users who use the network device, and group information items indicating respective groups to which the users belong;
  storing, at the network device, use permission information items on a per-group basis, each user permission item indicating which of the plurality of functions of the network device is permitted to be used by a respective group, and further storing at the network device a use permission information item for a default group, indicating which function is permitted to be used by the default group;
  transmitting, from the network device, an identification information item indicating one of the users trying to use the network device to the authentication device;
  transmitting, from the authentication device, upon receiving from the network device the identification information item indicating the user trying to use the network device, a group information item indicating the group to which the user indicated by the received identification information item belongs; and
  determining, at the network device, which of the plurality of functions of the network device the user trying to use the network device is permitted to use, based on the group information item received from the authentication device and a respective user permission information item stored at the network device, wherein if the group information item received from the authentication device indicates that the user trying to use the network device belongs to none of the groups, determining that the user is permitted to use a function permitted to be used by the default group.

6. A network device that performs a plurality of functions, comprising:
- a storing unit that stores use permission information items on a per-group basis, each item indicating which function of the network device is permitted to be used by users belonging to corresponding groups, wherein the storing unit further stores a use permission information item for a default group, indicating which function is permitted to be used by the default group;
- a transmitting unit that transmits an identification information item indicating one of the users trying to use the network device to an authentication device with which the network device is capable of communicating via a network, wherein the authentication device stores identification information items indicating users who use the network device, and group information items indicating respective groups to which the users belong; and
- a determining unit that determines which of the plurality of functions of the network device the user trying to use the network device is permitted to use, based on a group information item received from the authentication device indicating the group to which the user belongs and a respective user permission information item stored in the storing unit, wherein if the group information item received from the authentication device indicates that the user trying to use the network device belongs to none of the groups, the determining unit determines that the user is permitted to use a function permitted to be used by the default group.

7. A computer readable storage medium encoded with computer executable instructions, which when executed by a network device which is configured to perform a plurality of functions, causes the network device to perform a method comprising:
- storing use permission information items on a per-group basis, each item indicating which function of the network device is permitted to be used by users belonging to corresponding groups, and further storing a use permission information item for a default group, indicating which function is permitted to be used by the default group;
- transmitting an identification information item indicating one of the users trying to use the network device to an authentication device with which the network device is capable of communicating via a network, wherein the authentication device stores identification information items indicating users who use the network device, and group information items indicating respective groups to which the users belong; and
- determining which of the plurality of functions of the network device the user trying to use the network device is permitted to use, based on a group information item received from the authentication device indicating the group to which the user belongs and a respective user permission information item stored at the network device, wherein if the group information item received from the authentication device indicates that the user trying to use the network device belongs to none of the groups, determining that the user is permitted to use a function permitted to be used by the default group.

* * * * *